(12) United States Patent
Lefaux et al.

(10) Patent No.: US 8,361,601 B2
(45) Date of Patent: Jan. 29, 2013

(54) PLASTIC GLAZING PANEL HAVING UV CURABLE PRINTED PATTERN AND PROCESS FOR MAKING THE SAME

(75) Inventors: Christophe Lefaux, Ann Arbor, MI (US); Nandakumar Menon, Aurora, IL (US); Korey Stellmach, Aurora, IL (US); Sunitha K. Grandhee, Novi, MI (US); Keith D. Weiss, Fenton, MI (US); Ken Foster, Brighton, MI (US)

(73) Assignee: Exatec LLC, Wixom, MI (US)

( * ) Notice: Subject to any disclaimer, the term of this patent is extended or adjusted under 35 U.S.C. 154(b) by 1308 days.

(21) Appl. No.: 12/113,331

(22) Filed: May 1, 2008

(65) Prior Publication Data

US 2008/0274321 A1 Nov. 6, 2008

Related U.S. Application Data

(60) Provisional application No. 60/915,220, filed on May 1, 2007.

(51) Int. Cl.
*B41M 7/00* (2006.01)
(52) U.S. Cl. ....... 428/192; 428/38; 428/195.1; 428/203; 428/210; 296/146.1; 264/447
(58) Field of Classification Search ............... 428/195.1, 428/38, 192, 203, 210; 296/146.1; 264/447
See application file for complete search history.

(56) References Cited

U.S. PATENT DOCUMENTS

| | | | |
|---|---|---|---|
| 4,348,427 A | 9/1982 | Priola et al. | |
| 4,842,941 A * | 6/1989 | Devins et al. | 428/412 |
| 5,395,863 A * | 3/1995 | Burns et al. | 522/71 |
| 6,376,064 B1 * | 4/2002 | Gasworth et al. | 428/331 |
| 6,593,390 B1 * | 7/2003 | Johnson et al. | 522/74 |
| 6,794,439 B1 * | 9/2004 | Robertson et al. | 524/493 |
| 6,797,384 B2 * | 9/2004 | Gasworth et al. | 428/412 |
| 7,175,712 B2 | 2/2007 | Siegel | |
| 2001/0036989 A1 * | 11/2001 | Rohn et al. | 524/364 |
| 2003/0092789 A1 * | 5/2003 | Jin et al. | 522/81 |
| 2003/0187089 A1 * | 10/2003 | Hohenrieder et al. | 522/173 |
| 2004/0191521 A1 | 9/2004 | Weiss et al. | |

(Continued)

FOREIGN PATENT DOCUMENTS

| | | |
|---|---|---|
| EP | 0 080 246 | 6/1983 |
| GB | 1 407 069 | 9/1975 |

(Continued)

OTHER PUBLICATIONS

Technical Data Sheet N-Vinyl-2-Pyrrolidone (Feb. 1997) BASF Corporation.*
Novel Higher Molecular Weight HDDA Homologues for Rad-CUre Applications (Matthias Fies, Jul. 1, 2002).*

(Continued)

*Primary Examiner* — Gerard Higgins
*Assistant Examiner* — Christopher Polley
(74) *Attorney, Agent, or Firm* — Cantor Colburn LLP

(57) ABSTRACT

An economical method of manufacturing a plastic glazing panel having a decorative marking and/or opaque border printed from a UV curable ink is presented. This economical method includes the steps of forming a plastic panel; printing an opaque pattern from an ink, the pattern having an A-side and a B-side with the B-side being in contact with the plastic panel; curing the ink in the shape of the printed pattern using UV radiation directed at the ink from both the A-side and B-side; applying a weatherable layer on the A side of the pattern and on the plastic panel; curing the weatherable layer; and depositing an abrasion resistant layer onto the weatherable layer.

28 Claims, 4 Drawing Sheets

U.S. PATENT DOCUMENTS

| | | |
|---|---|---|
| 2005/0222295 A1 | 10/2005 | Siegel |
| 2005/0250869 A1 | 11/2005 | Claes et al. |
| 2006/0025496 A1* | 2/2006 | Grandhee et al. ............ 523/160 |
| 2006/0292311 A1 | 12/2006 | Kilburn et al. |

FOREIGN PATENT DOCUMENTS

| | | |
|---|---|---|
| GB | 2 029 433 A | 3/1980 |
| WO | WO 03/066301 | 8/2003 |
| WO | WO 2008/042731 | 4/2008 |

OTHER PUBLICATIONS

Ronald Kwiecinski, Material Safety Data Sheet for Coatings, Resins and Related Materials, Product Class: Screen Ink, Product Code: DXT-1599, Manufacturer: Coates Screen, A Member of Sun Chemical, St. Charles, IL, Mar. 18, 2005.

International Search Report and Written Opinion of PCT/US2008/062155, Oct. 13, 2008.

* cited by examiner

PLASTIC GLAZING PANEL HAVING UV CURABLE PRINTED PATTERN AND PROCESS FOR MAKING THE SAME

This application claims the benefit of U.S. Provisional Application Ser. No. 60/915,220 filed on May 1, 2007, entitled "UV CURABLE INK FOR A PLASTIC GLAZING SYSTEM", the entire contents of which are incorporated herein by reference.

FIELD

This invention relates to plastic glazing panels having a decorative marking or opaque border printed from an ink cured by exposure to UV radiation.

BACKGROUND

Plastic materials are being used in a number of automotive engineering applications to enhance vehicle styling. For example, plastic materials are currently used in the manufacturing of such parts and components as B-pillars, headlamps, and sunroofs. An emerging application for transparent plastic materials is automotive window systems. When a transparent plastic material is used to manufacture an automotive window, regulatory requirements call for the window to include some form of identification marking or logo. In addition, manufacturer's find it desirable for the automotive window to include an opaque fade-out border in order to enhance the overall appearance of the installed window. Finally, in order for plastic windows to be durable over a period of years, the window is covered by a coating that will provide the window with protection against weathering and scratches/abrasion.

In order to effectively mark a plastic window with an identification marking and a fade-out border, inks that are used must not only adhere to the surface of the plastic window, but also must be compatible with the protective coating system that is applied to the window's surface. Any ink used to mark the surface of a plastic window must not be softened, damaged, or removed during the application of the protective coating system. In addition, the inks need to be able to survive the rigorous testing required to qualify the product by the automotive industry.

The use of a UV curable ink to mark a plastic window offers a key advantage over thermally cured ink systems. Primarily, the use of a UV ink can increase productivity by decreasing the amount of time required to cure the ink. A conventional ink can take anywhere from 15 to 60 minutes to thermally cure, while a UV ink will cure within a matter of seconds. A further improvement in productivity can be obtained by reducing the cycle time required to remove "dried" ink residue left in the screen during the screen printing of a thermally curable ink. This "dried" ink residue arises from the evaporation of the solvent(s) in the thermally curable ink. The removal of a screen from the printing operation and replacing it with another screen and fresh ink can take upwards to an hour of time. The elimination of this cleaning operation along with the dramatic decrease in time required to cure a UV ink provides for substantial productivity gains.

The major problem associated with using a UV curable ink in a plastic glazing panel for an automotive window, is that typical commercially available UV inks are not compatible with the application of a protective coating system. The adhesion at the interface between the ink and the coating system or between the ink and the plastic window is weakened during the lifetime of the window, resulting in premature delamination or microcracking of the ink and/or coating system. One contributing factor to the occurrence of this phenomenon is that the inks applied need to be substantially opaque in nature. The complete curing of an opaque ink by the application of UV radiation onto the surface of the printed ink is difficult to accomplish. The UV radiation either becomes absorbed or is reflected upon interacting with the surface layer of the opaque ink, thereby, reducing or only partially curing the bulk of the ink; especially the ink located near the interface established with the plastic's surface.

Therefore, there is a need in the industry to be able to manufacture plastic glazing panels with a high level of productivity using a UV ink that is substantially curable and compatible with the application of a protective coating system.

SUMMARY

An economical method of manufacturing a plastic glazing panel having a decorative marking and/or opaque border printed from a UV curable ink is presented. This economical method includes the steps of forming a plastic panel; printing an opaque pattern from an ink, the pattern having an A-side and a B-side with the B-side being in contact with the plastic panel; curing the ink in the shape of the printed pattern using UV radiation directed at the ink from both the A-side and B-side; applying a weatherable layer on the B-side of the ink and on the plastic panel; curing the weatherable layer; and depositing an abrasion resistant layer onto the weatherable layer.

In one embodiment of the present invention, the UV curable ink is screen printed onto the surface of a substantially transparent plastic panel. The transparent plastic panel may be used as an automotive window, sunroof, or transparent body panel. The UV curable ink may include about 40 to 75 weight percent of a mixture of acrylate oligomers and monomers and about 1 to 6 weight percent of a photoinitiator.

In another embodiment of the present invention, the UV curable ink further includes about 5 to 20 weight percent N-vinyl-2-Pyrrolidone (NVP) to enhance the cure and adhesion to the plastic panel. The UV ink may also include various colorants (e.g., pigments and/or dyes) to provide the desired level of opacity; surfactants, defoamers, hindered amines, UVA absorbing molecules, cure accelerators, adhesion promoters, hardeners, viscosity modifiers, flow promoters, and light stabilizers.

The UV ink may be cured using a UV source in which the dominant wavelength of UV radiation emitted from the source is a wavelength absorbable by the printed ink. The ink is cured by application of UV radiation from both sides of the printed pattern (A-side and B-side).

In another embodiment of the present invention, the weatherable layer may include a single layer or multiple layers, such as a primer and a topcoat. The weatherable layer uses ultraviolet absorbing (UVA) molecules to protect the plastic panel from UV radiation.

In another embodiment of the present invention, the abrasion resistant layer is deposited using a vacuum deposition technique. One example of an abrasion resistant layer includes, but is not limited to, silicon oxy-carbide having a composition ranging from $SiO_x$ to $SiO_xC_yH_z$.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
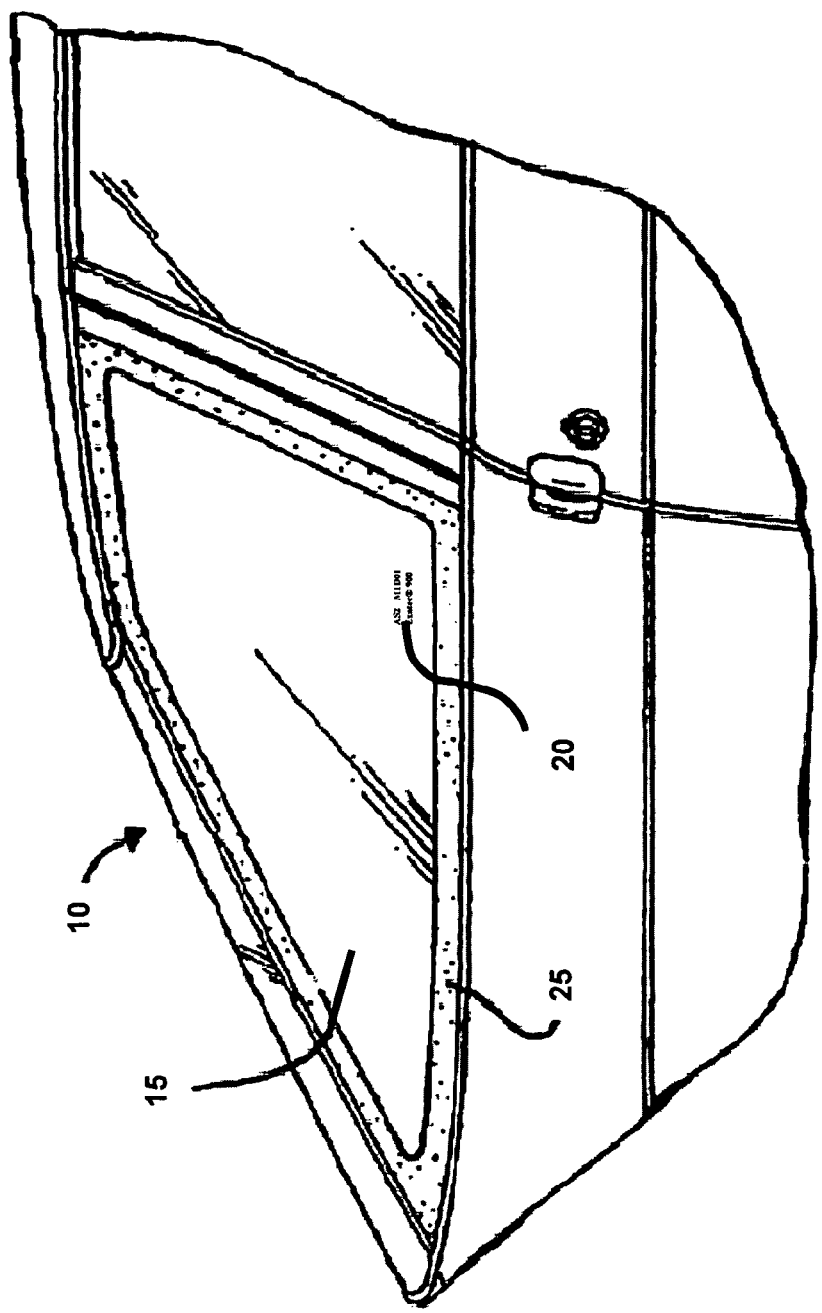
FIG. 1 is a depiction of an automobile incorporating a plastic window according to the principles of the present invention.

The following description is merely exemplary in nature and is in no way intended to limit the present disclosure or its application or uses. It should be understood that throughout the description and drawings, corresponding reference numerals indicate like or corresponding parts and features.

The present invention provides an economical method of manufacturing a plastic glazing panel that exhibits a decorative marking and/or opaque border printed from an ink cured by exposure to UV radiation. The plastic glazing panel is subsequently coated with a protective coating system to provide a high level of weatherability and abrasion resistance. Referring to FIG. 1, a plastic glazing panel may be used on an automobile 10 as a movable side window 15. The window 15 is shown with a printed opaque border 25 and logo/regulatory information 20. One skilled-in-the-art of automotive design will realize that the plastic glazing panel of the present invention can be used for other automotive windows, such as a backlite, sunroof, and fixed side window, among others.

Figure 2:
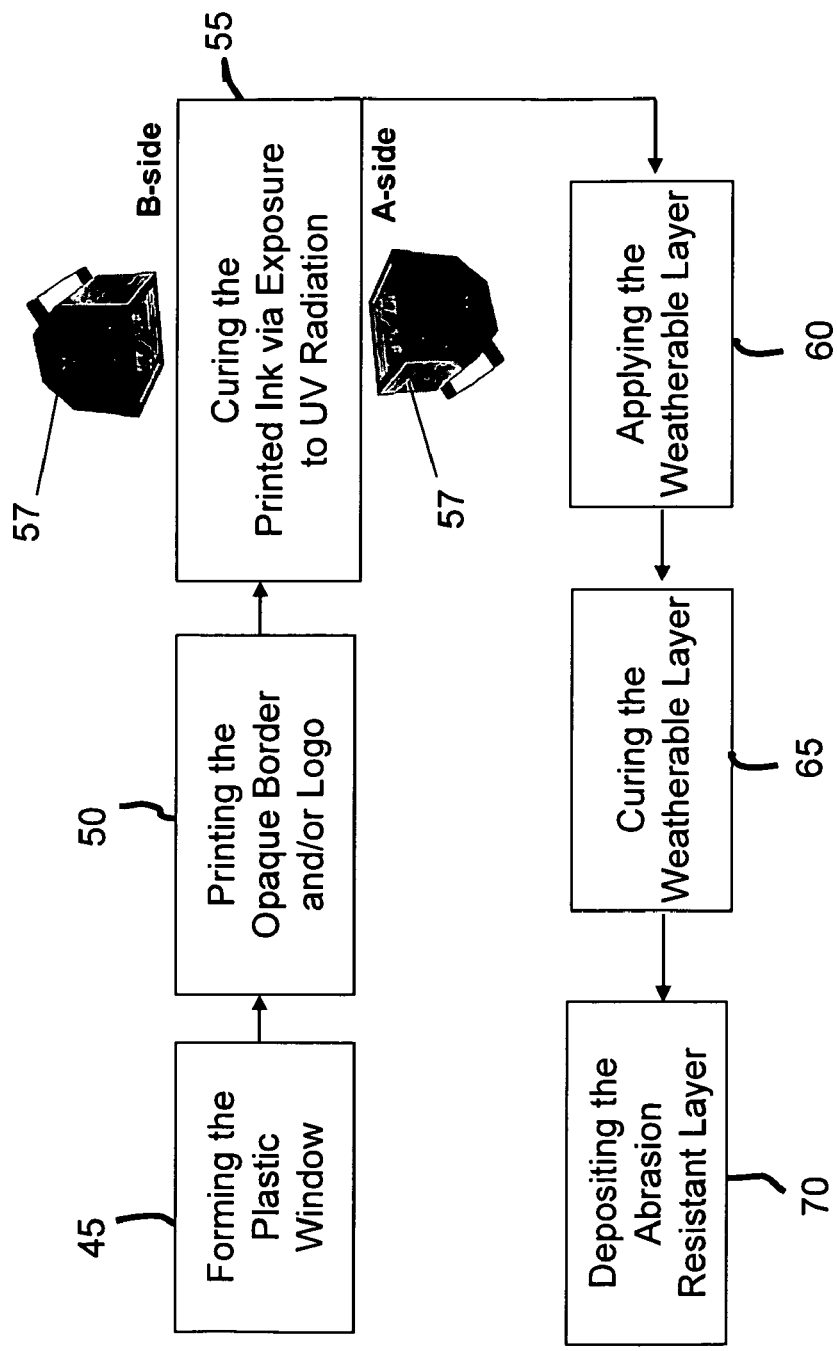
FIG. 2 is a schematic of a manufacturing process for a plastic glazing panel according to one embodiment of the present invention.

Referring to FIG. 2, an economical manufacturing process may generally be defined by first forming 45 a plastic substrate; then printing 50 the opaque border and/or decorative marking; followed by curing 55 the printed ink via exposure to UV radiation; applying 60 a weatherable layer onto the printed substrate; curing 65 the weatherable layer, and finally depositing 70 an abrasion resistant layer.

The transparent plastic panel may be formed 45 into a window, e.g., vehicle window, from plastic pellets or sheets through the use of any known technique to those skilled in the art, such as extrusion, molding, which includes injection molding, blow molding, and compression molding, or thermoforming, which includes thermal forming, vacuum forming, and cold forming. It is to be noted that the forming 45 of a window using plastic sheet may occur prior to printing as shown in FIG. 1, after printing 50 and curing 55 of the UV ink, or after application 60 and curing 65 of the weatherable coating without falling beyond the scope or spirit of the present invention. The use of plastic pellets to form 45 the plastic panel is done prior to printing 50 the opaque border or decorative marking.

An opaque border and decorative marking may be defined as a substantially opaque print applied 50 to the plastic panel for decorative purposes, to convey information (e.g., corporate, regulatory, etc.), or to hide or mask other vehicle components (e.g., adhesives). The opaque border may be applied 50 to the periphery of the transparent substrate to form a solid masking border, while a decorative marking may be applied to a portion of the viewing region of the window. The opaque border may further include a fade-out pattern to transition the border into the viewing region of the window. The fade-out pattern may incorporate a variety of shapes of variable size including dots, rectangles (lines), squares, and triangles, among others. The decorative marking may further include any combination of letters, symbols, and numbers including, but not limited to, corporate logos, trademarks, and regulatory designations.

In one embodiment of the present invention, the opaque border and decorative marking can be printed 50 onto the surface of the plastic panel via screen printing. Other known methods of printing 50 the opaque border and decorative marking on the plastic panel may also be utilized when deemed appropriate. A non-inclusive list of other known printing methods include pad printing, membrane image transfer printing, cylindrical printing, digital printing, robotic dispensing, mask/spray, ink-jet printing, and the like. The thickness of the printed ink may range from about 2 micrometers to about 1 mil (25.4 micrometers) with about 6 to 12 micrometers being preferred.

The printed border or marking is cured 55 upon exposure to UV radiation, such as that found in UV-A (315-400 nm), UV-B (280-315 nm), or UV-C (<280 nm). Any type of ultraviolet light source known to one skilled-in-the-art may be selected for curing the printed border or marking provided the dominant wavelength of UV radiation emitted from the source is selected to correspond with a wavelength absorbable by the printed ink. A combination of lamps may be utilized to provide a range in the wavelength emitted. Examples of ultraviolet light sources include high, medium, or low pressure mercury lamps, xenon lamps, microwave powered lamps, cold cathode tubes, black lights, UV lasers or excimer lamps, and an ultraviolet LED, among others. A variety of lamps with different spectral outputs are commercially available and may be utilized, such as bulb types H+ (210~320 nm), H (240~320 nm), D (350~400 nm), V (400~450 nm), and Q (430~470 nm). Although UV lamps typically use mercury as the principal emission source, other additives or dopants, such as metal halides, fluorescent molecules, and vaporized metals, among others may be utilized to provide modified emission spectra. Examples of various dopants, may include, but not be limited to, cadmium, iron, gallium, indium or lead. One example of a doped lamp exhibiting a consistent output is a microwave powered lamp commercially available from Fusion UV Systems Inc., Gaithersburg, Md. having a 300-600 watts/in. power output. In addition, the lamps may utilize various types of reflectors, such as elliptical or parabolic reflectors, to focus the output, particularly when utilized with 3-dimensional panels.

Upon curing 55 the UV ink, reactive groups within the ink react and crosslink forming a polymeric network. One hundred percent conversion is not usually achievable due to a decrease in mobility (e.g., vitrification) of the reactive species upon increasing the degree of cure. In fact, highly pigmented or opaque inks are more difficult to cure. In order to insure adequate adhesion to the plastic panel and solvent resistance to the subsequently applied 60 weatherable coating, the printed opaque ink is exposed to UV radiation from both directions 57. In other words, the printed ink is exposed to UV radiation from one set of lamps directly on its surface (A-side) and and from a second set of lamps through the plastic panel onto the interface between the panel and the ink (B-side). This dual exposure is possible since the plastic panel is substantially transparent in the region where the ink is printed. The energy applied to the printed ink during the cure period may be on the order of about 400 to 1200 mJ/cm².

The weatherable layer may be applied 60 to the printed panel by dip coating, flow coating, spray coating, curtain coating, spin coating, or any other techniques known to those skilled-in-the-art. The thickness of the weatherable layer may range from about 2 micrometers to several mils (1 mil=25.4 micrometers), with about 6 micrometers to 1 mil being preferred. The weatherable layer may then be cured 65 using a mechanism selected as one of air drying, UV absorption, thermal absorption, condensation addition, thermally driven entanglement, cross-linking induced by cationic or anionic species, or a combination thereof.

The weatherable layer may be over-coated via the deposition 70 of an abrasion resistant layer. This abrasion resistant layer may be either comprised of one layer or a combination of multiple inter-layers of variable composition. The abrasion resistant layer may be applied by any vacuum deposition technique known to those skilled-in-the-art, including but not limited to plasma-enhanced chemical vapor deposition (PECVD), expanding thermal plasma PECVD, plasma polymerization, photochemical vapor deposition, ion beam deposition, ion plating deposition, cathodic arc deposition, sputtering, evaporation, hollow-cathode activated deposition, magnetron activated deposition, activated reactive evaporation, thermal chemical vapor deposition, and any known sol-gel coating process.

In one embodiment of the present invention, a specific type of PECVD process used to deposit the abrasion resistant layers comprising an expanding thermal plasma reactor is preferred. This specific process (called hereafter as an expanding thermal plasma PECVD process) is described in detail in U.S. patent application Ser. No. 10/881,949 (filed Jun. 28, 2004) and U.S. patent application Ser. No. 11/075,343 (filed Mar. 8, 2005), the entirety of both being hereby incorporated by reference. In an expanding thermal plasma PECVD process, a plasma is generated via applying a direct-current (DC) voltage to a cathode that arcs to a corresponding anode plate in an inert gas environment. The pressure near the cathode is typically higher than about 150 Torr, e.g., close to atmospheric pressure, while the pressure near the anode resembles the process pressure established in the plasma treatment chamber of about 20 mTorr to about 100 mTorr. The near atmospheric thermal plasma then supersonically expands into the plasma treatment chamber.

The reactive reagent for the expanding thermal plasma PECVD process may comprise, for example, octamethylcyclotetrasiloxane (D4), tetramethyldisiloxane (TMDSO), hexamethyldisiloxane (HMDSO), vinyl-D4 or another volatile organosilicon compound. The organosilicon compounds are oxidized, decomposed, and polymerized in the arc plasma deposition equipment, typically in the presence of oxygen and an inert carrier gas, such as argon, to form an abrasion resistant layer.

Figure 3:
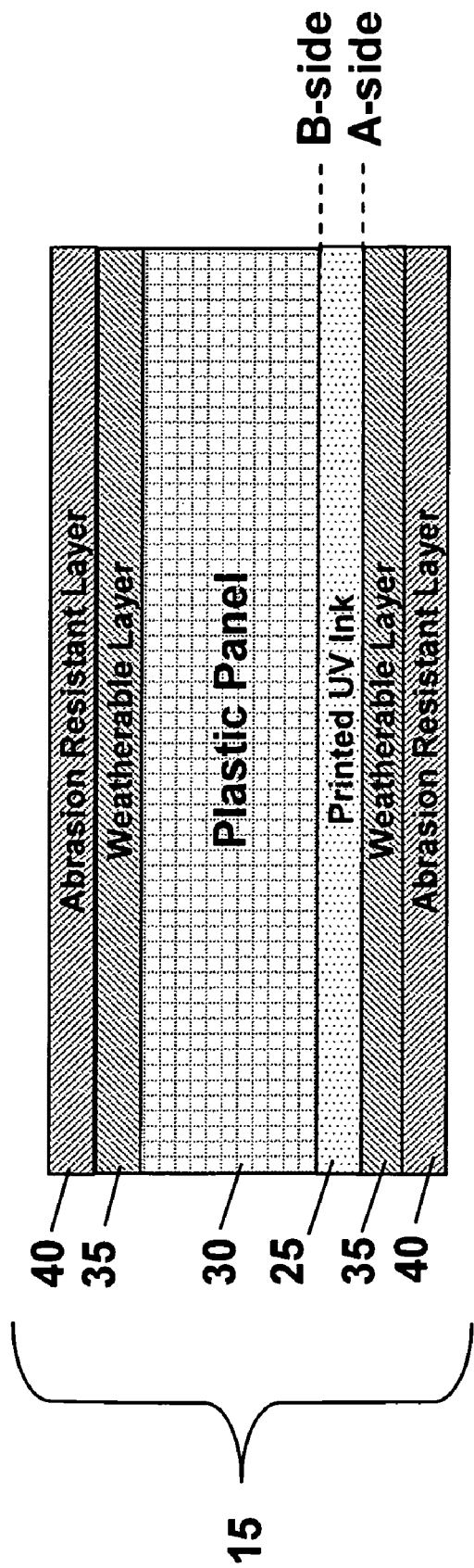
FIG. 3 is a diagrammatic representation of a cross-section of a glazing panel from FIG. 1 according to one embodiment of the present invention.

Referring now to FIG. 3, a cross-section of a plastic glazing panel according to one embodiment of the present invention is shown. The plastic panel 30 may be comprised of any thermoplastic or thermoset polymeric resin. The polymeric resins include, but are not limited to, polycarbonate, acrylic, polyarylate, polyester, and polysulfone, as well as copolymers and mixtures thereof. In order to function appropriately as a window and to allow for the dual curing of the printed ink, the plastic panel is substantially transparent.

Figure 4:
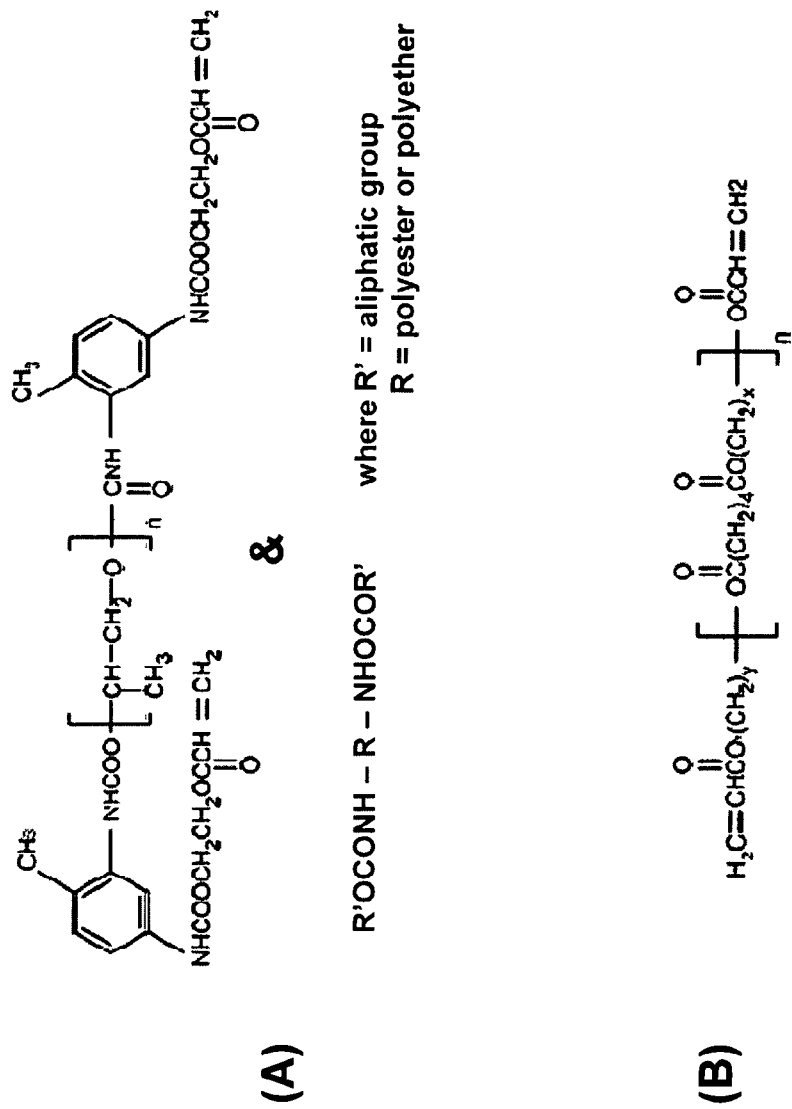
FIG. 4A is an example of typical chemical formulas for urethane acrylate oligomers according to one embodiment of the present invention.
FIG. 4B is an example of a typical chemical formula for a polyester acrylate oligomer according to another embodiment of the present invention.

Referring now to FIG. 4, the printed UV ink 25 may be comprised of a mixture of various multifunctional acrylate oligomers and monomers with aliphatic urethane acrylates, polyester acrylates, and polyether acrylates being preferred oligomers. The weight percent of the acrylate mixture in the ink is about 40 to 75 percent. Urethane acrylates, are typically prepared by reacting polyisocyanates with hydroxyl alky acrylates to form oligomers having multifunctionality. On the other hand, polyether acrylates are usually prepared by esterifying polyetherols with acrylic acid. The urethane acrylates may comprise aliphatic end groups with either a polyester or polyether backbone. The properties of the acrylate oligomers may vary depending upon the degree of functionality and the nature of the reactants utilized in their preparation and the resulting molecular weight of the oligimers. Several examples of urethane acrylates are depicted in FIG. 4A and one example of a polyester acrylate in FIG. 4B. One skilled-in-the-art will recognize that the oligomer formulas shown in FIG. 4 are non-inclusive of all of the various oligomers that could be used in the ink of the present invention. Suitable acrylate monomers include, but are not limited to, Hexanediol Diacrylate (HDDA), trimethylolpropane triacrylate (TMPTA), Pentaerythritol Triacrylate (PETA) and their alkoxylated counterparts.

The UV ink 25 may also comprise between about 5 to 20 weight percent of N-vinyl-2-pyrrolidone (NVP, CAS #66-12-0) to enhance the adhesion with the plastic panel upon curing of the ink. Optionally, depending upon the desired properties of the plastic glazing panel, the use of NVP may be minimized or eliminated in the ink formulation.

Since a photoinitiator is normally used with a free radical cure mechanism, the UV ink may comprise about 1 to 6 weight percent of a photoinitiator. The photoinitiatiors may include, but are not limited to benzophenone, substituted benzophenones, 1-hydroxycyclohexyl phenyl ketone, thioxanthones, 2-hydroxy-2-methyl-1-phenylpropan-1-one, diphenyliodonium fluoride, acyl phoshine oxides, 2-benyl-2-dimethylamino-1-(morpholiniphenyl)butan-1-one, and triphenylsulfonium hexfluorphosphate.

The UV ink 25 may further comprise other additives, such as colorants (e.g., pigments and/or dyes), fillers, surfactants, defoamers, tackifiers, adhesion promoters, viscosity promoters, weatherability additives. Examples of pigments include, but are not limited to, carbon black, colored organic pigments, and metal oxide pigments; while suitable dyes include various direct dyes, acidic dyes, basic dyes, and/or reactive dyes. Fumed silica may be added to the UV ink to promote the rheology necessary to hold fine detail during printing. Various surfactants and defoamers may include any organic, organo-silicon, and silicone molecules that are well known to one skilled-in-the-art to function in such a capacity. In order to enhance the weatherability of the printed and cured ink, the ink may include hindered amines or UV absorber molecules. One example of a UV ink 25 that may be used according to one embodiment of the present invention is the acrylate ink available as DXT-1599 from Coates Screen (a member of Sun Chemical), St. Charles, Ill. The percent solids present in the UV ink 25 is about 100% meaning that substantially all of the components that make up the ink formulation remain in the printed ink after it is cured.

The weatherable layer 35 may be comprised of, but not limited to, silicones, polyurethanes, acrylics, polyesters, polyurethane acrylates, and epoxies, as well as mixtures or copolymers thereof. The weatherable layer 35 preferably includes ultraviolet (UV) absorbing molecules, such as hydroxyphenyltriazine, hydroxybenzophenones, hydroxylphenylbenzotriazoles, hydroxyphenyltriazines, polyaroylresorcinols, and cyanoacrylates, among others to protect the underlying plastic panel and printed ink from degradation caused by exposure to the outdoor environment.

The weatherable layer 35 may be comprised of one homogenous layer (e.g., primerless) or multiple sub-layers (e.g., primer and topcoat). A primer typically aids in adhering the topcoat to the plastic panel. The primer for example may include, but not be limited to, acrylics, polyesters, epoxies, and copolymers and mixtures thereof. Similarly, the topcoat may include, but not be limited to, polymethylmethacrylate, polyvinylidene fluoride, polyvinylfluoride, polypropylene, polyethylene, polyurethane, silicone, polymethacrylate, polyacrylate, polyvinylidene fluoride, silicone hardcoat, and mixtures or copolymers thereof. One specific example of a weatherable layer 35 comprising multiple sub-layers is the combination of an acrylic primer (SHP401 or SHP470, Momentive Performance Materials, Waterford, N.Y.; or SHP-9X, Exatec LLC, Wixom, Mich.) with a silicone hard-coat (AS4000 or AS4700, Momentive Performance Materials; or SHX, Exatec LLC). One of many examples of a primerless weatherable layer 35 is PHC-587 offered by Momentive Performance Materials.

A variety of additives may be added to the weatherable layer 35, e.g., to either or both the primer and the topcoat, such as colorants (tints), rheological control agents, mold release agents, antioxidants, and IR absorbing or reflecting pigments, among others. The type of additive and the amount of each additive is determined by the performance required by the plastic glazing panel to meet the specification and requirements for use as a window.

The abrasion resistant layer 40 may be comprised of aluminum oxide, barium fluoride, boron nitride, hafnium oxide, lanthanum fluoride, magnesium fluoride, magnesium oxide, scandium oxide, silicon monoxide, silicon dioxide, silicon nitride, silicon oxy-nitride, silicon oxy-carbide, hydrogenated silicon oxy-carbide, silicon carbide, tantalum oxide, titanium oxide, tin oxide, indium tin oxide, yttrium oxide, zinc oxide, zinc selenide, zinc sulfide, zirconium oxide, zirconium titanate, or a mixture or blend thereof. Preferably, the abrasion resistant layer 40 is comprised of a composition ranging from $SiO_x$ to $SiO_xC_yH_z$ depending upon the amount of carbon and hydrogen atoms that remain in the deposited layer.

The printed ink 25 must pass multiple tests that have been specified by automotive original equipment manufacturers (OEM). Such tests include a water immersion test at elevated temperatures, and a Cataplasma test. Unless the ink passes all the tests specified, the plastic glazing panel 15 can not be used in the assembled motor vehicle. For plastic glazing, it also is desirable that the printed ink 25 provide opacity greater than 95% with greater than 99.8% being preferred due to current "glass" glazing regulatory constraints. One skilled-in-the-art will recognize that the current opacity requirement may be relaxed for plastic glazing due to the use of coatings that absorb UV radiation, thereby, providing the necessary level of protection for any underlying adhesive bond similar to the level that is provided in a glass glazing panel by insuring near complete opacity of the ink.

The water immersion test includes an initial cross-hatch adhesion test (tape pull) according to ASTM D3359-95 followed by submersing the printed plastic glazing panels in distilled water at elevated temperatures around 65° C. for approximately 10 days. The adhesion of the ink and protective layers (i.e., weatherable 35 & abrasion resistant 40 layers) is tested about every other day up to the maximum of 10 days. A printed ink 25 passes the test only if greater than 95% retention of the ink and protective layers is obtained on the $10^{th}$ day.

The Cataplasma test includes applying the following adhesive primers and adhesive: (1) Betaseal™ 43518—clear primer; (2) Betaseal™ 48520A—black primer; and (3) Betaseal™ 57302—urethane adhesive (Dow Automotive, Auburn Hills, Mich.) to the plastic glazing panel. The portion of the plastic glazing panel being tested should be large enough to apply two adhesive beads (i.e., each bead about 1 inch wide and no less than about 9 inches in length) and two adhesion crosshatches (applied as a post-test). The test protocol is well known to one skilled-in-the-art as Dow Automotive AG, Test Method No. 039E—Cataplasma Treatment.

The Cataplasma test exposes the plastic glazing panel 15 along with cured adhesive beads applied to the surface of the glazing panel to high humidity at an elevated temperature followed by a low temperature shock (i.e., wrapping the panel for 7 days in wet cotton at 70° C. followed by 3 hrs at −20° C.). Prior to exposing the sample to high humidity one adhesive bead is pulled and the degree of cohesive failure evaluated in this "Pre-test" pull. In order to pass this initial adhesive pull, greater than 95% cohesive failure of the adhesive needs to be observed. The samples are then exposed to the high humidity cycling as stated above. Upon completion of the testing, and after being equilibrated at room temperature (about 23° C.) the plastic glazing panel 15 is subjected to visual inspection for optical changes or defects, such as the development of haze, color change, blisters, microcracks, etc., as well a cross-hatch adhesion test performed according to the previously described ASTM protocol. Finally, another adhesive bead is pulled on each sample and the degree of cohesive failure of the adhesive is examined once again in this "Post-test" pull. In order for a printed plastic glazing panel 15 to pass the Cataplasma test there must be no change in optical appearance, greater than 95% retention of the ink 25 and protective layers 35 & 40 to the substrate after the cross-hatch adhesion (tape pull) test, and greater than 75% cohesive failure of the adhesive in the Post-test pull. Therefore, for the plastic glazing panel 15 to pass the above test, the entire glazing panel, i.e., plastic panel 30/cured ink 25/cured weatherable layer 35/abrasion resistant layer 40 must exhibit a high level of hydrolytic stability at different temperatures and moisture conditions.

The following specific examples are given to illustrate the invention and should not be construed to limit the scope of the invention.

Example 1

Conventional UV Ink Application

Polycarbonate panels were formed via injection molding and then printed with an opaque border using a screen printing technique with multiple different compositions of commercially available UV curable inks as described in Table 1. The inks were cured by exposing the formulations (Runs 1 to Run 9) to UV radiation according to the manufacturer's specifications. The inks were irradiated on one side (A-side). All the inks were then coated with an acrylic primer (SHP-9X, Exatec LLC, Wixom, Mich.) and a silicone hard-coat (SHX, Exatec LLC, Wixom, Mich.) according to the manufacturer's specification. An abrasion resistant layer was then deposited using expanding thermal plasma enhanced chemical vapor deposition (PECVD). The resulting plastic glazing panel is known as Exatec® 900 (Exatec LLC). All samples were found to lack sufficient adhesion upon completion of the manufacturing sequence to pass (pass=>95% retention) the ASTM cross-hatch adhesion test (D3359-95) as described in Table 1. This example demonstrates that UV inks (Runs 1-Run 9) cured via conventional means are not substantially cured to the degree necessary for satisfactory use in a plastic glazing panel.

Example 2

Dual Cure Process

Polycarbonate panels were formed using injection molding and then printed with an opaque border using a screen printing technique with several UV ink compositions as identified in Table 2 and Table 3. The inks were cured by exposing the formulations (Runs 10 to Run 19) to UV radiation according to the manufacturer's specifications. The inks were irradiated from both sides (A-side and B-side). The energy applied to the ink during the cure cycle was about 850 mJ/cm$^2$. All inks were found to exhibit opacity greater than about 99.9% at a print thickness of about 10 micrometers.

TABLE 1

| | | # of Samples | # Samples Fail | # Samples Pass | Comments |
|---|---|---|---|---|---|
| | | | ASTM D3359-95 | | |
| R1 | 071-009 (Sericol, United Kingdom) | 5 | 4 | 1 | Total delamination |
| R2 | TF-4450 (Polymeric Imaging Inc., Kansas City, MO) | 4 | 3 | 1 | Spotty adhesion |
| R3 | MSK-1019 (Nor Cote Int. Inc., Crawfordsville, IN) | 5 | 5 | 0 | Total delamination |
| R4 | UV Vinex 3578/3579 (Nazdar, Shawnee, KS) | 4 | 3 | 1 | Spotty adhesion |
| R5 | UV Vinex 3478/3479 (Nazdar, Shawnee, KS) | 4 | 3 | 1 | Spotty adhesion |
| R6 | DXT-1599, surfactant B (Coates Screen) | 9 | 9 | 0 | Blisters |
| R7 | DXT-1599, surfactant C (Coates Screen) | 3 | 3 | 0 | Blisters |
| R8 | DXT-1599, surfactant D (Coates Screen) | 3 | 3 | 0 | Total delamination |
| R9 | DXT-1599, surfactant E (Coates Screen) | 3 | 3 | 0 | Total delamination |

All the inks were then coated with an acrylic primer (SHP-9X, Exatec LLC, Wixom, Mich.) and a silicone hard-coat (SHX, Exatec LLC, Wixom, Mich.) according to the manufacturer's specification. An abrasion resistant layer was then deposited using expanding thermal plasma enhanced chemical vapor deposition (PECVD). The resulting plastic glazing panel is known as Exatec® 900 (Exatec LLC). All samples were found to exhibit sufficient adhesion upon completion of the manufacturing sequence (Day 0) and after water immersion for 10 days to pass (pass=>95% retention) the ASTM cross-hatch adhesion test (D3359-95) as described in Table 2. This example demonstrates that UV inks (Runs 10-Run 15) cured via a dual cure according to one embodiment of the present invention exhibit acceptable opacity and adhesion for use in a plastic glazing panel.

TABLE 2

| | | | ASTM D3359-95 (% retention) | | | | | |
|---|---|---|---|---|---|---|---|---|
| | Sample ID | Ink Composition | Day 0 | | Day 1 | | Day 4 | Day 11 |
| R10 | 491-13604-02739 | DXT-1599, Surfactant B | 100 | 100 | 99 | 100 | 99 | 100 | 99 |
| R11 | 591-28204-03690 | DXT-1599, Surfactant B | 99 | 99 | 99 | 100 | 100 | 100 | 100 |
| R12 | 591-28204-03695 | DXT-1599, Surfactant B | 100 | 99 | 99 | 99 | 100 | 99 | 99 |
| R13 | 491-28104-03010 | DXT-1599, Surfactant D | 100 | 100 | 99 | 100 | 100 | 99 | 100 |
| R14 | 491-38104-03007 | DXT-1599, Surfactant D | 100 | 99 | 99 | 100 | 100 | 99 | 99 |
| R15 | 491-28104-02989 | DXT-1599, Surfactant D | 100 | 100 | 100 | 100 | 100 | 99 | 99 |

The plastic glazing panel prepared with the inks described above were then tested in a Cataplasma test as previously defined. In this test all samples were found to pass the pre-adhesive pull test (Pass=>95% cohesive failure), post-adhesive line pull test (Pass=>75% cohesive failure), and the ASTM adhesion cross-hatch testing (Pass=>95% retention) as shown for Runs 16-Run 19 in Table 3. This example demonstrates that UV inks (Runs 10-Run 19) cured via a dual cure means according to one embodiment of the present invention are substantially cured to the degree necessary for satisfactory use in a plastic glazing panel.

TABLE 3

| Sample ID | Ink Composition | Cohesive Failure (%) of Adhesive Pre-Test | Cohesive Failure (%) of Adhesive Post-Test | ASTM D3359-95 (% Retention) |
|---|---|---|---|---|
| R16 | 3009-1 DXT-1599, Surfactant B | 100 | 94 | 99 |
| R17 | 3009-1 DXT-1599, Surfactant B | 99 | 96 | 99 |
| R18 | 2755-1 DXT-1599, Surfactant D | 100 | 91 | 98 |
| R19 | 2765-2 DXT-1599, Surfactant D | 100 | 77 | 98 |

A person skilled in the art will recognize from the previous description that modifications and changes can be made to the present disclosure without departing from the scope of the disclosure as defined in the following claims. A person skilled-in-the-art will further recognize that the opacity, cross-hatch adhesion, and Cataplasma test measurements described are standard measurements that can be obtained by a variety of different test methods. The test methods described in the examples represents only one available method to obtain each of the required measurements.

What is claimed is:

1. A plastic glazing panel for use as an automotive window, sunroof, or transparent body panel, the glazing panel comprising:
   a substantially transparent plastic panel;
   a printed pattern of a UV curable ink that is cured and has an A-side and a B-side with the B-side being in contact with the plastic panel;
   a weatherable layer in contact with the A-side of the printed pattern and with the plastic panel; and
   an abrasion resistant layer in contact with the weatherable layer;
   wherein the printed pattern is substantially opaque;
   wherein the panel passes an adhesion test by having greater than 95% retention of the ink and protective layers on a $10^{th}$ day, wherein the adhesion test includes an initial tape pull according to ASTM D3359-95 followed by submersing the panel in distilled water at elevated temperatures around 65° C. for approximately 10 days with additional tape pulls according to ASTM D3359-95 every other day up to 10 days; and
   wherein the printed pattern is at least substantially cured upon exposure to UV radiation directed at both the A-side and the B-side of the printed pattern.

2. The plastic glazing panel of claim 1, wherein the UV curable ink comprises about 40 to 75 weight percent of a mixture of acrylate oligomers and monomers and about 1 to 6 weight percent of a photoinitiator.

3. The plastic glazing panel of claim 2, wherein the UV curable ink comprises about 100% solids after being cured.

4. The plastic glazing panel of claim 2, wherein the mixture of acrylate oligomers is selected from the group consisting of: urethane acrylates, polyester acrylates, polyether acrylates, and a mixture thereof.

5. The plastic glazing panel of claim 2, wherein the mixture of acrylate monomers is selected from the group consisting of Hexanediol Diacrylate (HDDA), trimethylolpropane triacrylate (TMPTA), Pentaerythritol Triacrylate (PETA), an alkoxylated counterpart of HDDA, TMPTA, or PETA, and a mixture thereof.

6. The plastic glazing panel of claim 2, wherein the UV curable ink further comprises about 5 to 20 weight percent N-vinyl-2-Pyrrolidone (NVP) to enhance the cure and adhesion to the plastic panel.

7. The plastic glazing panel of claim 2, wherein the UV curable ink further comprises a colorant selected from the group consisting of carbon black, organic colored pigments, metal oxide pigments, direct dyes, acidic dyes, basic dyes, reactive dyes, and a mixture thereof in order to provide a substantially opaque printed pattern.

8. The plastic glazing panel of claim 2, wherein the UV curable ink further comprises an additive selected from the group consisting of a surfactant, defoamer, hindered amines, UVA absorbing molecules, and a mixture thereof.

9. The plastic glazing panel of claim 2, wherein the UV curable ink further comprises a material selected from the group consisting of a cure accelerator, an adhesion promoter, a hardener, a viscosity modifier, a flow promoter, a light stabilizer, and a mixture thereof.

10. The plastic glazing panel of claim 1, wherein the printed pattern is selected from the group consisting of an opaque border, decorative marking, and a mixture thereof.

11. The plastic glazing panel of claim 1, wherein the plastic panel comprises a thermoplastic or thermoset polymeric resin.

12. The plastic glazing panel of claim 11, wherein the polymeric resin is a material selected from the group consisting of polycarbonate, acrylic, polyarylate, polyester, polysulfone, and a copolymer thereof, and a mixture thereof.

13. The plastic glazing panel of claim 1, wherein the weatherable layer is a material selected from the group consisting of silicones, polyurethanes, acrylics, polyesters, polyurethane-acrylates, epoxies, and a copolymer thereof, and a mixture thereof.

14. The plastic glazing panel of claim 13, wherein the weatherable layer comprises ultraviolet absorbing (UVA) molecules to protect the plastic panel from UV radiation.

15. The plastic glazing panel of claim 13, wherein the weatherable layer comprises a primer and a topcoat.

16. The plastic glazing panel of claim 15, wherein the primer is a material selected from the group consisting of acrylics, polyesters, epoxies, copolymers, and mixtures thereof.

17. The plastic glazing panel of claim 15, wherein the topcoat is a material selected from the group consisting of polymethylmethacrylate, polyvinylidene fluoride, polyvinylfluoride, polypropylene, polyethylene, polyurethane, silicone, polymethacrylate, polyacrylate, polyvinylidene fluoride, silicone hardcoat, a copolymer thereof, and a mixture thereof.

18. The plastic glazing panel of claim 1, wherein the abrasion resistant layer is a material selected from the group consisting of aluminum oxide, barium fluoride, boron nitride, hafnium oxide, lanthanum fluoride, magnesium fluoride, magnesium oxide, scandium oxide, silicon monoxide, silicon dioxide, silicon nitride, silicon oxy-nitride, silicon oxy-carbide, hydrogenated silicon oxy-carbide, silicon carbide, tantalum oxide, titanium oxide, tin oxide, indium tin oxide, yttrium oxide, zinc oxide, zinc selenide, zinc sulfide, zirconium oxide, zirconium titanate, and a mixture thereof.

19. A method of manufacturing a plastic glazing panel for use as an automotive window, sunroof, or transparent body panel, the method comprising the steps of:
   forming a plastic panel;
   printing an opaque pattern from an ink, the printed pattern having an A-side and a B-side with the B-side being in contact with the plastic panel;
   curing the ink of the printed pattern using UV radiation directed at the A-side of the printed pattern;
   curing the ink of the printed pattern using UV radiation directed at the B-side of the printed pattern;
   applying a weatherable layer on the ink and the plastic panel, on the A-side;
   curing the weatherable layer; and
   depositing an abrasion resistant layer on the weatherable layer;
   wherein the panel passes an adhesion test by having greater than 95% retention of the ink and protective layers on a $10^{th}$ day, wherein the adhesion test includes an initial tape pull according to ASTM D3359-95 followed by submersing the panel in distilled water at elevated temperatures around 65° C. for approximately 10 days with additional tape pulls according to ASTM D3359-95 every other day up to 10 days.

20. A method of manufacturing the plastic glazing panel of claim 19, wherein the step of forming the plastic includes a method selected from the group consisting of injection molding, blow molding, compression molding, thermal forming, vacuum forming, and cold forming.

21. A method of manufacturing the plastic glazing panel of claim 19, wherein the ink printing step includes a method selected from the group consisting of screen printing, pad printing, and ink jet printing.

22. A method of manufacturing the plastic glazing panel of claim 19, wherein the ink curing step uses a UV source that the dominant wavelength of UV radiation emitted from the source is a wavelength absorbable by the printed ink.

23. A method of manufacturing the plastic glazing panel of claim 19, wherein the step of applying the weatherable layer uses a method selected from the group consisting of flow coating, spray coating, curtain coating, dip coating, and spin coating.

24. A method of manufacturing a plastic glazing panel of claim 19, wherein the step of curing the weatherable layer includes a method selected from the group consisting of air drying, UV absorption, thermal absorption, condensation addition, thermally driven entanglement, cross-linking induced by cationic or anionic species, and a combination thereof.

25. A method of manufacturing the plastic glazing panel of claim 19, wherein the step of depositing an abrasion resistant layer uses a vacuum deposition technique.

26. A method of manufacturing the plastic glazing panel of claim 25, wherein the step of depositing an abrasion resistant layer uses a vacuum deposition technique selected from the group consisting of plasma-enhanced chemical vapor deposition (PECVD), expanding thermal plasma PECVD, plasma polymerization, photochemical vapor deposition, ion beam deposition, ion plating deposition, cathodic arc deposition, sputtering, evaporation, hollow-cathode activated deposition, magnetron activated deposition, activated reactive evaporation, thermal chemical vapor deposition, and sol-gel coating processes.

27. A method of manufacturing the plastic glazing panel of claim 19, wherein the step of forming plastic panel occurs after the steps of printing and curing the printed pattern and before the step of applying the weatherable coating.

28. A plastic glazing panel made by the method of claim 19.

* * * * *